Oct. 28, 1952
D. A. McLEAN
2,615,955
IMPREGNATED ELECTRICAL CONDENSER
Filed Dec. 29, 1949
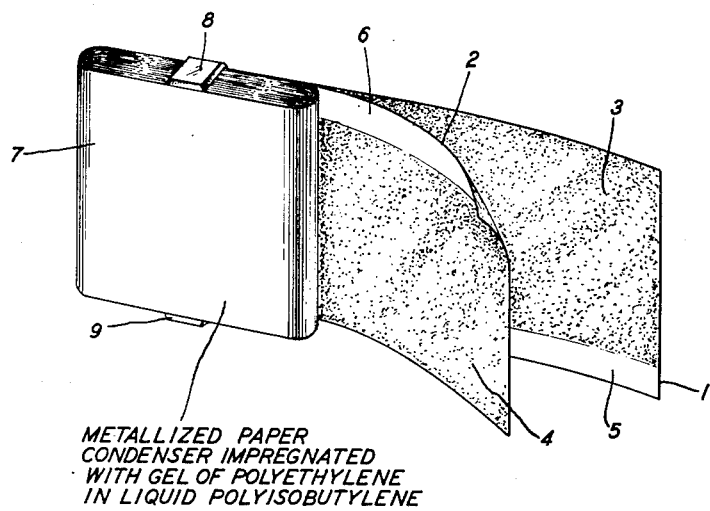
METALLIZED PAPER
CONDENSER IMPREGNATED
WITH GEL OF POLYETHYLENE
IN LIQUID POLYISOBUTYLENE
INVENTOR
D. A. McLEAN
BY
Edwin B. Cave
ATTORNEY Patented Oct. 28, 1952

2,615,955

UNITED STATES PATENT OFFICE 2,615,955

IMPREGNATED ELECTRICAL CONDENSER

David A. McLean, Chatham, N. J., assignor to Bell Telephone Laboratories, Incorporated, New York, N. Y., a corporation of New York Application December 29, 1949, Serial No. 135,719

10 Claims. (Cl. 175—41)

This invention relates to impregnated electrical condensers and particularly to such condensers impregnated with an impregnant which at ordinary operating temperatures is a gel.

In a capacitor containing sheets of paper or other porous materials as spacers between the electrodes, it is normally necessary to impregnate the pores of the spacer with an organic dielectric material. This impregnation eliminates air by replacing it with the organic dielectric, resulting in increased dielectric strength and increased effective dielectric constant.

These impregnants are either normally liquid or normally solid. When normally liquid impregnants, such as mineral oil or pentachlorodiphenyl, are used, the impregnated condenser must be enclosed in an expensive hermetically sealed container. The need for such an expensive hermetic seal can be eliminated by using a normally solid impregnant, such as paraffin or chlorinated naphthalene, which has a melting point above the normal operating temperature range of the condenser. A capacitor so impregnated can be inexpensively housed by casting around it an envelope of material having low moisture permeability.

However, it has been found that, when capacitors impregnated with the usual solid impregnants are exposed to temperatures in the vicinity of 0° F. or lower, they tend to crack owing to a combination of brittleness and cooling strains, opening up fissures of low electrical strength. Therefore when condensers are intended to have a normal operating temperature range extending down to these low temperatures or to temperatures approaching or extending above the normal melting point of the common normally solid impregnants, it is more desirable to use normally liquid impregnants in spite of the additional cost incident to their use.

In metallized paper condensers intended for use under conditions under which solid impregnants are not desirable and normally liquid impregnants would therefore be used, further disadvantages of these normally liquid impregnants become apparent. Metallized paper condensers have a small size for a given capacity. This small size results from the use of a paper spacer which is much thinner than the spacers used for metal foil condensers. It is possible to use these thin spacers in metallized paper condensers, wherein the electrodes consist of extremely thin metal coatings deposited on the surface of the paper by metal vapor deposition in a vacuum, or by an equivalent process, since these thin metal coatings have a "self-healing" characteristic not ordinarily processed by metal foil electrodes.

This "self-healing" operates by burning away the thin metal coating around any point in the paper spacer which is conductive and which causes a short circuit between the electrodes at that pont. During the operation of this self-healing, a small but definite decomposition of the adjacent dielectric occurs, resulting in the formation of ionically conductive decomposition products. With solid impregnants these ionic products are effectively immobilized and no undue rise in the conductivity of the dielectric results. However, when it is necessary to use liquid impregnants, the mobility of the decomposition products is high and the effect of self-healing on the electrical properties of the dielectric is serious and cumulative, resulting in continually increasing conductivity.

According to the present invention, paper condensers are impregnated with compositions which in the normal operating temperature range are gels of a solid dielectric substance in a liquid dielectric substance. These gels are free from the disadvantageous properties of solid impregnants, namely the tendency to crack at low temperatures, and are free from the disadvantages of liquid impregnants, namely the high ionic mobility and the necessity for an expensive sealed container.

The gels used for impregnating the condensers of the present invention are made up of normally solid polymers of ethylene (polyethylene) and normally liquid butene polymers (polybutene, or particularly polyisobutylene). Since both of these ingredients are hydrocarbons, they have excellent electrical properties. The gels are formed by adding the polyethylene to the polyisobutylene at temperatures above the melting point of the polyethylene and mixing the ingredients until a homogeneous liquid is produced. The condensers can be impregnated with this hot, homogeneous liquid.

Where the material is maintained in this hot liquid state in the impregnating tank for long periods of time and particularly where it is exposed to air at these high temperatures, it is desirable to add an antioxidant to reduce the possibility of degradation of the molecular weights of the ingredients. From 0.1 per cent to 1 per cent, and preferably about 0.5 per cent, of any common antioxidant, such as polymerized trimethyl dihydroquinoline, has been found suitable.

When the liquid cools after impregnation, small crystallite regions of polyethylene are formed throughout the body of liquid polybutene and the intermolecular forces between the two phases result in a non-fluid gel. Since the resulting compound is a gel, it possesses a finite static shear strength and will not flow unless a finite stress is exerted, a property in considerable contrast to that of a liquid of high viscosity which, although it may give the appearance of rigidity, nevertheless possesses a zero static shear strength and therefore flows under infinitesimal stress if given sufficient time. The gels differ from solids, on the other hand, in being soft and plastic so that they yield under moderate pressure and no appreciable mechanical stresses are set up in them whether they are cooled to low temperatures or heated to high temperatures.

Apparatus embodying these gel impregnants is shown in the accompanying drawing which is a perspective view of a rolled metallized paper condenser, partly unrolled.

The condenser shown in this drawing is made up of two sheets 1, 2 of paper, each having a vapor deposited coating 3, 4 of a suitable metal, such as zinc, on one of its faces. A margin 5, 6 extending the entire length of each of these sheets is left free from deposited metal. The two sheets are superimposed with their metallized sides each facing in the same direction and with their metal-free margins on opposite edges and are rolled longitudinally to form the rolled body 7. Contact terminals 8, 9 are formed on opposite edges of the rolled body by spraying on a small block of low melting metal, such as lead-tin solder, in contact with the respective edges so as to form an electrical connection with the edge of the metallizing coating of that sheet which does not have a metal-free margin at that edge. The entire condenser is then impregnated with the polyethylene-polyisobutylene composition described above.

These polyethylene-polybutene compounds have low moisture permeability and are sufficiently tacky to adhere to metal surfaces. For these reasons, they can serve both as the impregnating compound and the potting or sealing compound. This makes it possible to impregnate paper capacitors, of either the metal foil type or the metallized paper type, in a container of metal or other suitable material so that after impregnation the impregnated condenser is embedded in a body of the gelled impregnating material which fills the container, no further potting or sealing being required.

A very suitable impregnating compound according to the present invention is made up of 7.5 per cent by weight of polyethylene having a molecular weight of about 12,000, as determined by the Staudinger method, in 92 per cent polyisobutylene having a molecular weight of about 3000 and 0.5 per cent of an antioxidant, such as polymerized trimethyl dihydroquinone. This composition is prepared by mixing the ingredients together at a temperature above the melting point of the polyethylene, such as 130° C. to 135° C., until a clear homogeneous mass is obtained.

Soft gels suitable for the present invention can be formed in similar manner from other low molecular weight polyethylenes having a molecular weight between 4000 and 15,000 or preferably between 7000 and 15,000. Any viscous liquid polybutene, as of molecular weight between 2000 and 7000, or preferably between 2000 and 5000, may be used. As stated above, it is desirable that an antioxidant in suitable amount, as from 0.1 per cent to 1 per cent be added.

The gels for use in the present invention may be formed with widely varying proportions of polyethylene and polybutene. Preferably, the amount of polyethylene in the gel is between 5 per cent and 35 per cent although gels of satisfactory properties may be produced when the amount of polyethylene is as high as 90 per cent, particularly when the lower molecular weight polyethylenes are used. The remainder of the composition, aside from the antioxidant, is polybutene, as discussed above, and therefore the proportions of this ingredient vary preferably from 65 per cent to 95 per cent, although as little as 10 per cent may be present.

Examples of other gels which can be used are one formed from 90 per cent of polyethylene of molecular weight of about 4000 and 10 per cent of polyisobutylene of molecular weight of about 3000 and one formed from 60 per cent of polyethylene of molecular weight of about 7000 and 40 per cent of polyisobutylene of molecular weight of about 3000. In each case, an antioxidant, such as 0.5 per cent polymerized trimethyl dihydroquinoline, may be added.

The invention has been described in terms of its specific embodiments and, since certain modifications and equivalents may be apparent to those skilled in the art, this description is intended to be illustrative of, and not to constitute a limitation upon the scope of the invention.

What is claimed is:

1. An electric condenser comprising a pair of electrodes separated by a paper spacer impregnated with a soft plastic gel of a fusible, normally solid hydrocarbon polymer in a viscous, normally liquid hydrocarbon polymer.

2. An electric condenser comprising a pair of electrodes separated by a paper spacer impregnated with a soft, plastic gel consisting essentially of polyethylene and a viscous, normally liquid polybutene.

3. An electric condenser comprising a pair of electrodes separated by a paper spacer impregnated with a composition consisting essentially of a gel of between about 5 per cent and about 90 per cent of polyethylene having a molecular weight between about 4000 and about 15,000 and the remainder a viscous, liquid polyisobutylene having a molecular weight between about 2000 and about 7000.

4. An electric condenser as described in claim 3 which is formed of metallized paper sheets.

5. An electric condenser as described in claim 3 wherein the gel composition contains an antioxidant.

6. An electric condenser as described in claim 3 wherein the polyethylene is present in the gel in an amount between 5 per cent and 30 per cent.

7. An electric condenser comprising a pair of electrodes separated by a paper spacer impregnated with a gel consisting essentially of about 7.5 per cent of polyethylene of molecular weight of about 12,000 and the remainder polyisobutylene of molecular weight of about 3000.

8. A metallized paper capacitor impregnated with a gel consisting essentially of about 7.5 per cent of polyethylene of molecular weight of about 12,000 and the remainder polyisobutylene of molecular weight of about 3000.

9. A capacitor as described in claim 8 wherein the gel contains an antioxidant.

10. A capacitor as described in claim 9 wherein the antioxidant is 0.5 per cent of polymerized trimethyl dihydroquinoline.

DAVID A. McLEAN.

REFERENCES CITED

The following references are of record in the file of this patent:

UNITED STATES PATENTS

| Number | Name | Date |
|---|---|---|
| 971,667 | Dean | Oct. 4, 1910 |
| 1,929,453 | Semon | Oct. 10, 1933 |
| 2,323,020 | Dorn | June 29, 1943 |
| 2,414,300 | Hamilton | Jan. 14, 1947 |
| 2,428,608 | Bass | Oct. 7, 1947 |

FOREIGN PATENTS

| Number | Country | Date |
|---|---|---|
| 517,649 | England | Feb 5, 1940 |